US 6,405,980 B1

(12) United States Patent
Carter, Jr.

(10) Patent No.: US 6,405,980 B1
(45) Date of Patent: Jun. 18, 2002

(54) CONTROL SYSTEM FOR ROTOR AIRCRAFT

(75) Inventor: Jay W. Carter, Jr., Wichita Falls, TX (US)

(73) Assignee: Cartercopters, L.L.C., Wichita Falls, TX (US)

( * ) Notice: Subject to any disclaimer, the term of this patent is extended or adjusted under 35 U.S.C. 154(b) by 0 days.

(21) Appl. No.: 09/644,405

(22) Filed: Jul. 25, 2000

Related U.S. Application Data (60) Provisional application No. 60/145,565, filed on Jul. 26, 1999.

(51) Int. Cl.[7] ............................................. B64C 13/28
(52) U.S. Cl. ........................ 244/230; 244/17.25; 244/8; 244/225
(58) Field of Search .............................. 244/220, 221, 244/223, 224, 225, 230, 17.25, 17.11, 8, 75 R (56) References Cited

U.S. PATENT DOCUMENTS

| | | | | |
|---|---|---|---|---|
| 2,380,580 A | * | 7/1945 | La Cierva ........................ 244/6 |
| 3,138,349 A | * | 6/1964 | Piascki ....................... 244/230 |
| 4,059,247 A | * | 11/1977 | Prewitt ........................ 244/230 |
| 4,088,039 A | * | 5/1978 | Bolag et al. ................. 244/230 |
| 4,171,113 A | * | 10/1979 | Townsend .................... 244/230 |
| 5,058,825 A | * | 10/1991 | Rabouyt ...................... 244/230 |
| 5,190,243 A | * | 3/1993 | Guimbal ................... 244/17.25 |
| 5,727,754 A | | 3/1998 | Carter, Jr. ....................... 244/8 |

* cited by examiner

*Primary Examiner*—Galen L. Barefoot
(74) *Attorney, Agent, or Firm*—Bracewell & Patterson, L.L.P.

(57) ABSTRACT

A rotor aircraft has an adjusting mechanism that controls the sensitivity of the control stick relative to fore and aft tilt of the rotor. The control stick is pivotable between fore and aft directions as well as laterally about a control stick pivot point. A rotor linkage is connected between the control stick and the rotor rotor head. The rotor linkage assembly tilts the rotor head in response to tilting movement of the control stick. The linkage assembly has a control point that rotates at a radius about the control stick pivot point. An adjusting member located between the control stick and the linkage assembly can be moved to change the radius of the control point to the control stick pivot point. The change in radius corresponds to the amount of tilt that the rotor head make while the control stick moves between full aft and full forward positions. The control stick also controls ailerons and a horizontal stabilizer but these control services are not affected by the adjusting member.

19 Claims, 6 Drawing Sheets

FIG. 3 NO TRIM MID STROKE

FIG. 4 NO TRIM FULL AFT

FIG. 6
NO TRIM
FULL AFT

FIG. 5
NO TRIM
MID STROKE

FIG. 10
FULL TRIM
FULL AFT

FIG. 9
FULL TRIM
MID STROKE

CONTROL SYSTEM FOR ROTOR AIRCRAFT

CROSS-REFERENCE TO RELATED APPLICATION

This application claims the benefit of Provisional Application filed Jul. 26, 1999, Ser. No. 60/145,565.

FIELD INTERVENTION

This invention relates in general to aircraft control systems and in particular to a control for a rotor aircraft for desensitizing movement of the control stick relative to tilt of the rotor at higher speeds.

BACKGROUND OF INVENTION

U.S. Pat. No. 5,727,754 discloses a rotor aircraft that has a fuselage, a rotor mounted to a tiltable spindle, wings extending from the fuselage and a propeller for propelling the aircraft in forward flight. A clutch connects the rotor to the engine to spin the rotor while the aircraft is still on the ground. As the aircraft begins to lift, the clutch mechanism releases the rotor from the engine and the rotor continues to spin due to its momentum. The propeller pushes the aircraft at the same time causing the wings to begin developing lift. As the aircraft speeds up, the rotor is tilted forward causing less airflow through the rotor, with the wings sustaining more of the load. Forward flight causes the rotor to free wheel.

The patent discloses a control stick for tilting the rotor forward, rearward and lateral directions. A control stick also controls a horizontal stabilizer. At a selected forward flight speed, a wrist control mounted on top of the main control stick is tilted forward. The wrist control moves tilts the rotor and the horizontal stabilizer at or close to the same rate and in the same direction so that the angle between them stay essentially constant. While workable, improvements are desired.

SUMMARY OF INVENTION

The control system of this invention has a linkage assembly connected between the control stick and the spindle for tilting the spindle in fore and aft directions in response to movement of the control stick. An adjusting member is member is movable between first and second positions to reposition at least portions of the linkage assembly relative to the control stick between gross and fine positions. In the fine position, the linkage assembly desensitizes the control stick so that a selected fore and aft movement of the control stick causes less tilting movement of the spindle than while in the gross position.

This is accomplished by having a control point in the linkage assembly that rotates about a pivot point of the control stick at a selected radius. The adjusting member will vary the radius, which in turn changes the tilting response of the rotor spindle. A smaller radius will result in a substantially smaller tilting movement of the rotor spindle for full aft to full forward movement of the control stick.

The adjusting member does not affect other movements caused by the control stick. The horizontal stabilizer, mounted at the aft of the end of the fuselage, is connected to the control stick so that forward movement of the control stick causes downward tilting of the horizontal stabilizer. Full forward and aft movement of the control stick results in full downward and forward tilting of the horizontal stabilizer regardless of the position of the adjusting member.

Also, lateral movement of the control stick tilt the rotor spindle laterally as well as pivoting ailerons mounted to the wings. The tilting movement is not affected by any position of the adjusting member.

BEST MODE FOR CARRYING OUT THE INVENTION

Figure 1:
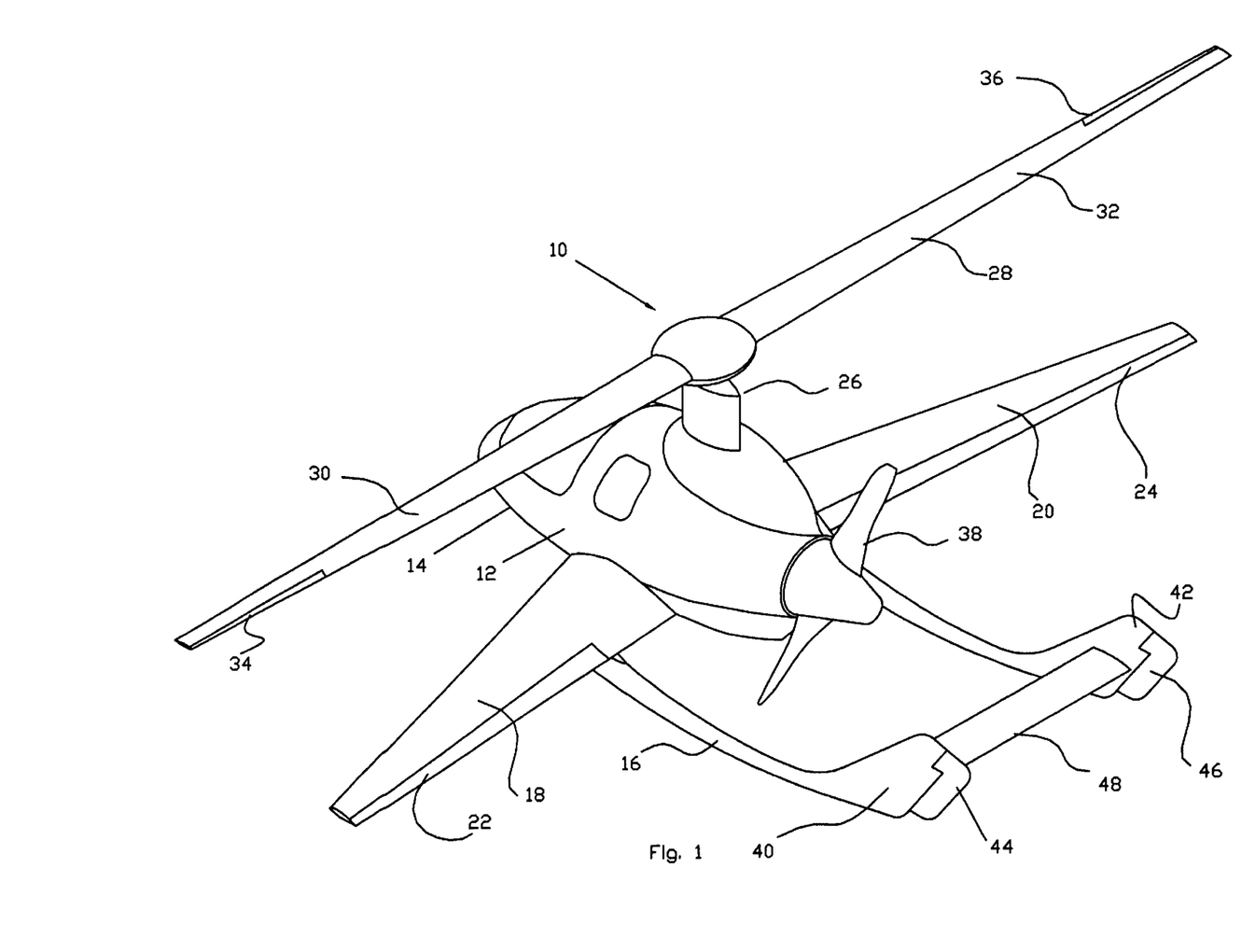
FIG. 1 is a perspective view of an aircraft for use with the control system of this invention.

Referring to FIG. 1, a high speed rotor aircraft 10 for use with this invention is generally constructed with the technology disclosed in U.S. Pat. No. 5,727,754, all of which material is hereby incorporated by reference. Craft 10 includes a fuselage 12 having a forward portion 14 and a rearward portion or tail 16. Fixed wings 18, extend outward from forward portion 14, each having an aileron 22, 24 on a rearward edge. Ailerons 22,24 are pivotally mounted at their front edge to wings 18, 20 such that their rear edge can be lifted out of the plane of wing 22, 24.

Forward portion 14 encloses a cockpit (not shown) for a pilot and passengers or payload. Extending upwardly from forward portion 14 behind the cockpit is a tiltable rotor head, preferably a spindle 26, that supports a high inertia rotor 28. Tiltable spindle 26 allows rotor 28 to tilt forward and rearward and side to side relative to fuselage 12 while rotating. Other types of rotor heads may be employed other than spindle 26, such as a swash plate cyclic design, such as used on helicopters. Rotor 28 has blades 30, 32, each having an adjustable angle of attack, referred to as collective pitch, and a weighted portion 34, 36 near the tip. A propeller 38 is mounted aft of the forward portion 14 and faces rearward. An engine (not shown) mounted in an aft portion of fuselage 12 drives propeller 38 and rotor 28. The engine is disengaged from rotor 28 during flight with a torque limiting clutch (not shown).

A pair of fins 40,42 extend upward from tail 16. Each fin 40,42 has a rudder 44, 46 on its rearward edge mounted to pivot out of the plane of fins 40, 42. A horizontal stabilizer 48 mounted with an adjustable angle of attack spans fins 40,42. Preferably, horizontal stabilizer 48 is a stabilator, in that the entire airfoil tilts, not just a trailing portion, although either type would be workable.

Figure 2:
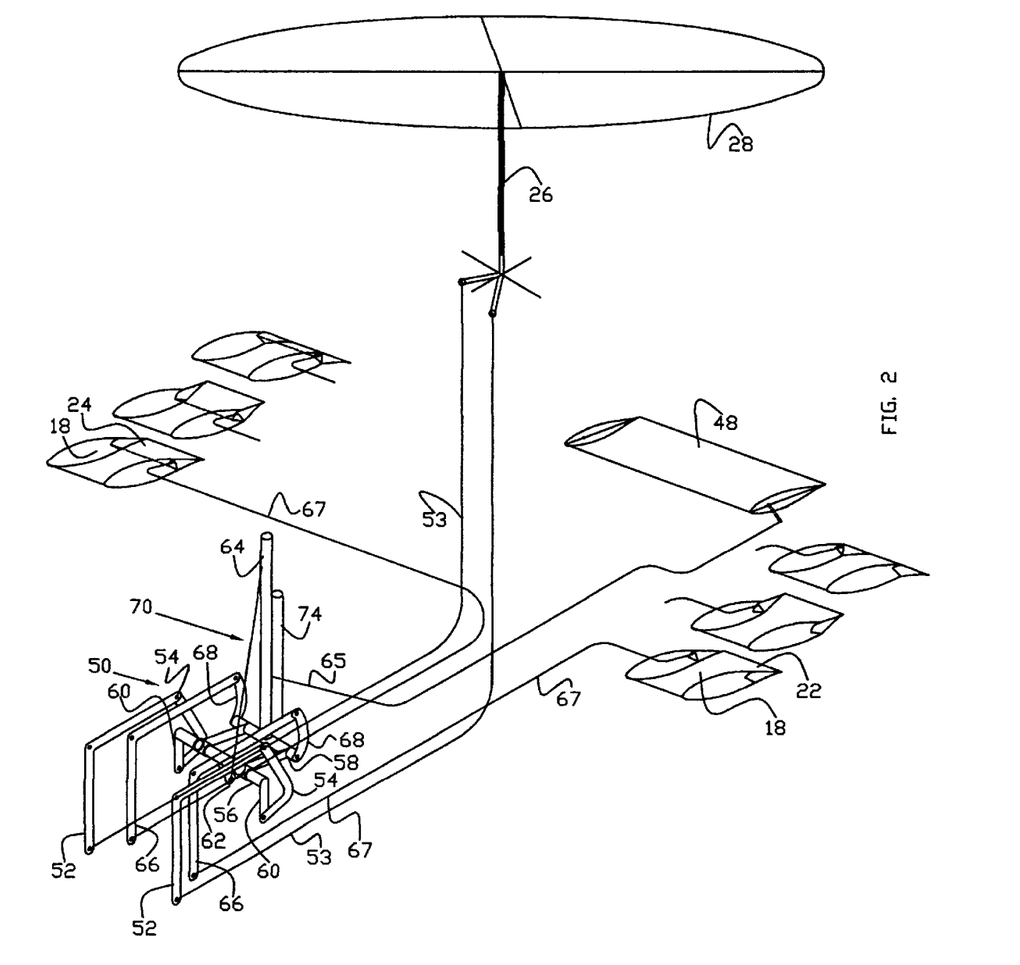
FIG. 2 is a schematic of a control system according to the invention.
Figure 3:
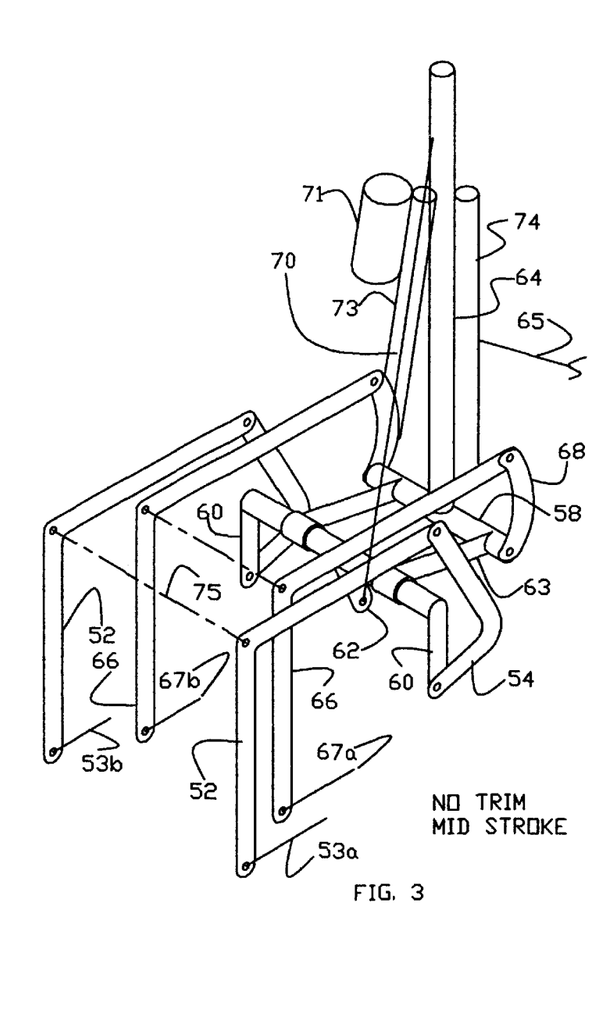
FIG. 3 is an enlarged perspective view of the control system shown in FIG. 2, with the extensible link extended and the control stick mid-stroke.
Figure 4:
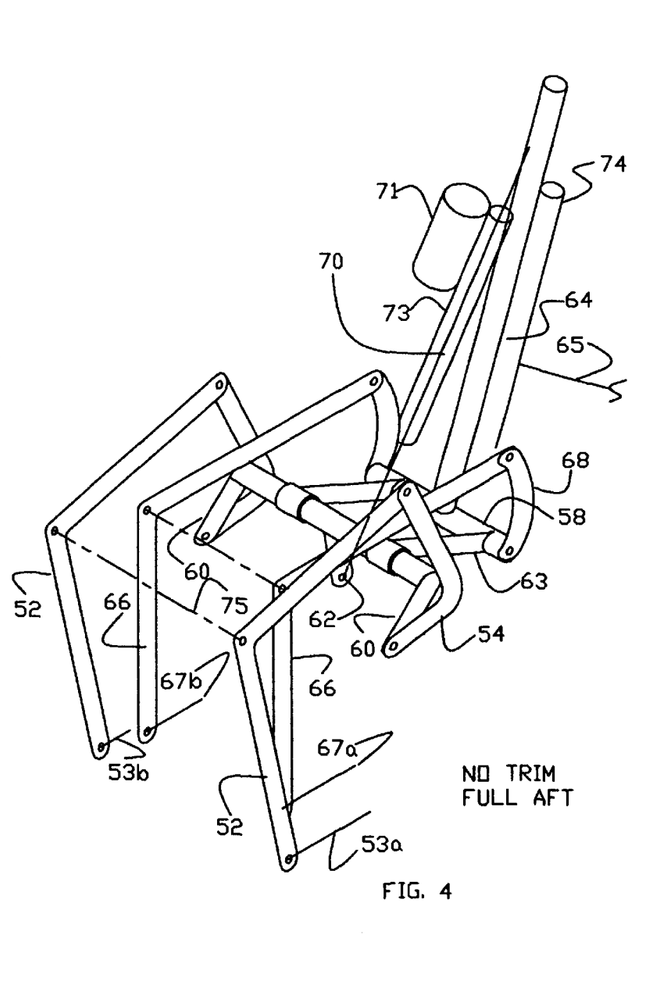
FIG. 4 is an enlarged perspective view of the control system shown in FIG. 2, with the extensible link extended and the control stick full aft stroke.

Referring to FIG. 2 and FIG. 3, The pilot controls various aspects of craft 10 with control system 50 of this invention, including: forward to rearward tilt of rotor 28; side to side tilt of rotor 28; and the relative horizontal angle of each aileron 22, 24 and angle of horizontal stabilizer 48. The angle of attack of rotor blades 30, 32, or collective pitch, and the relative vertical angle of rudders 44, 46 are controlled separately. A collective pitch mechanism (not shown) controls the collective pitch of blades 30, 32, which is the pitch of each blade 30, 32 relative to the plane of rotation.

Control system 50 has a pair of L-shaped rotor bell-cranks 52 mounted at spaced intervals in a vertical plane such that one leg of the L-shape points generally downward and the other points generally rearward. Each rotor bell-crank 52 rotates about a horizontal axis passing through the angle of the L-shape. The downward pointing leg of each rotor bell-crank 52 is linked to rotor 28 with push/pull cables 53 such that when the rotor bell-cranks 52 rotate in a direction pushing cables 53 toward rotor 28, rotor 28 tilts rearward on the spindle 26 and when rotor bell-cranks 52 rotate in the opposite direction pulling cables 53, rotor 28 tilts forward. Push/pull cable 53 is a flexible control cable that resists buckling when loaded in compression.

The rearward pointing leg of each rotor bell-crank 52 is rotatably joined to an end of L-shaped intermediate link 54. The other end of each intermediate link 54 is rotatably joined at opposed ends of a transversely positioned ratio bar 56. Ratio bar 56 is rearward of rotor bell-cranks 52 and supported to rotate about a horizontal axis by a control bar 58. Ratio bar 56 has three extending legs, two laterally outward legs 60 and a center leg 62. Intermediate links 54 attach at the ends of outward legs 60 opposite ratio bar 56.

Control bar 58 is mounted rearward of ratio bar 56 to rotate about a horizontal axis. Control bar 58 has two arms 63 which extend generally forward from control bar 58 and support ratio bar 56. A control stick 64 extends upwardly from control bar 58 and is linked to horizontal stabilizer 48 with push/pull cable 65 such that when the upper end of control stick 64 is moved forward, in addition to tilting spindle 26 forward, the rearward edge of horizontal stabilizer 48 is tilted downward.

A pair of L-shaped aileron bell-cranks 66 are mounted inboard of rotor bell-cranks 52 in a vertical plane such that one leg of the L-shape points generally downward and the other points generally rearward. The downward pointing leg of the left aileron bell-crank 66 is linked to the left aileron 22, and the downward pointing leg of the right aileron bell-crank 66 is linked to the right aileron 24. Left aileron 22 is linked with a push/pull cable 67a, such that pushing cable 67a will tilt aileron 22 downward and pulling cable 67a will tilt aileron 22 upward. Right aileron 24 is linked via another push/pull cable 67b, such that pushing cable 67b will tilt aileron 24 downward and pulling cable 67b will tilt aileron 24 upward.

The rearward pointing leg of each aileron bell-crank 66 is joined to an end of L-shaped stability link 68 which is rotatably linked to opposing ends of control bar 58. Forward and rearward rotation of control bar 58 does not move ailerons 22, 24 or aileron bell-cranks 66.

Figure 5:
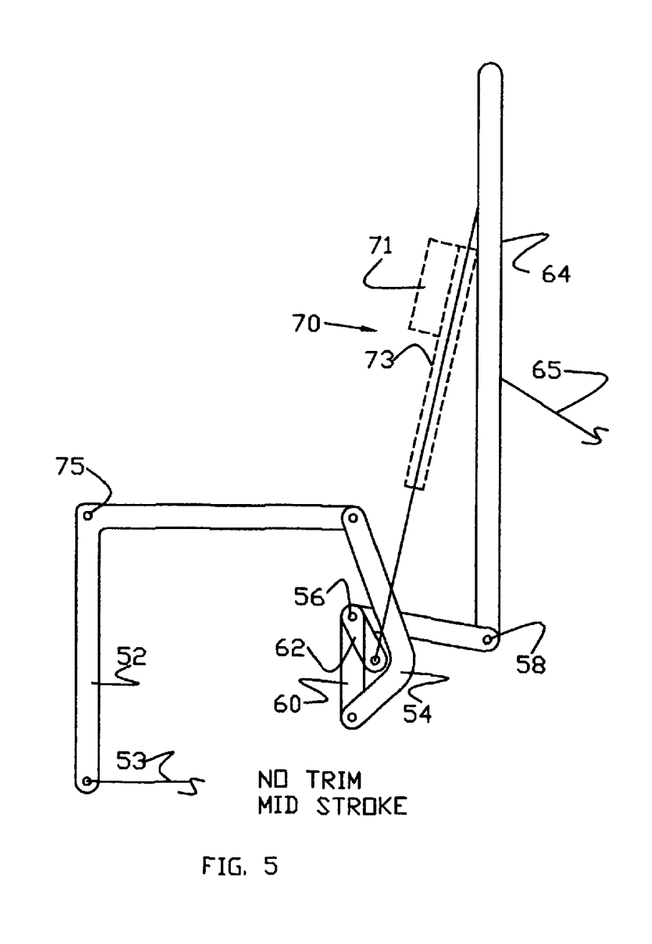
FIG. 5 is a schematic side view of the control system with the extensible link extended and the control stick in mid-stroke. Aileron bell-cranks have been removed for clarity.

Referring to FIG. 5, an extensible link 70 joins control stick 64 with center leg 62. Extensible link 70 has a motor 71 and gear train 73 for selectively moving it between an extended length position in FIG. 5 and FIG. 6 and a retracted length position in FIG. 7 and FIG. 8. Extensible link 70 has a push button control (not shown) for actuation by the pilot.

Figure 6:
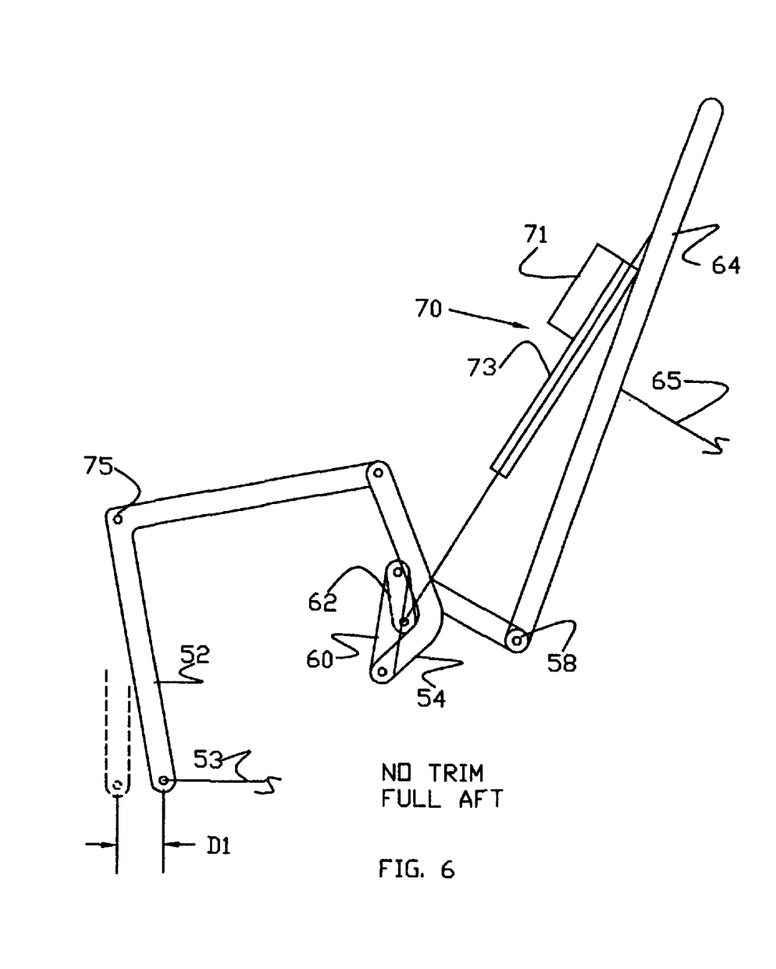
FIG. 6 is a schematic side view of the control system with the extensible link extended and the control stick full aft stroke. Aileron bell-cranks have been removed for clarity.

FIG. 5 and FIG. 6 represent the movement of the control system while untrimmed, less than about 125 mph. Moving control stick 64 fully aft from the neutral position pivots rotor bell-crank 52 about pivot point axis 75. The angle between control stick 64 and arm 63 is fixed. This pushes the aft ends of rotor bell-crank 52 upward, pushing cables 53 a distance D1. This causes spindle 26 (FIG. 2) to tilt rearward.

Figure 7:
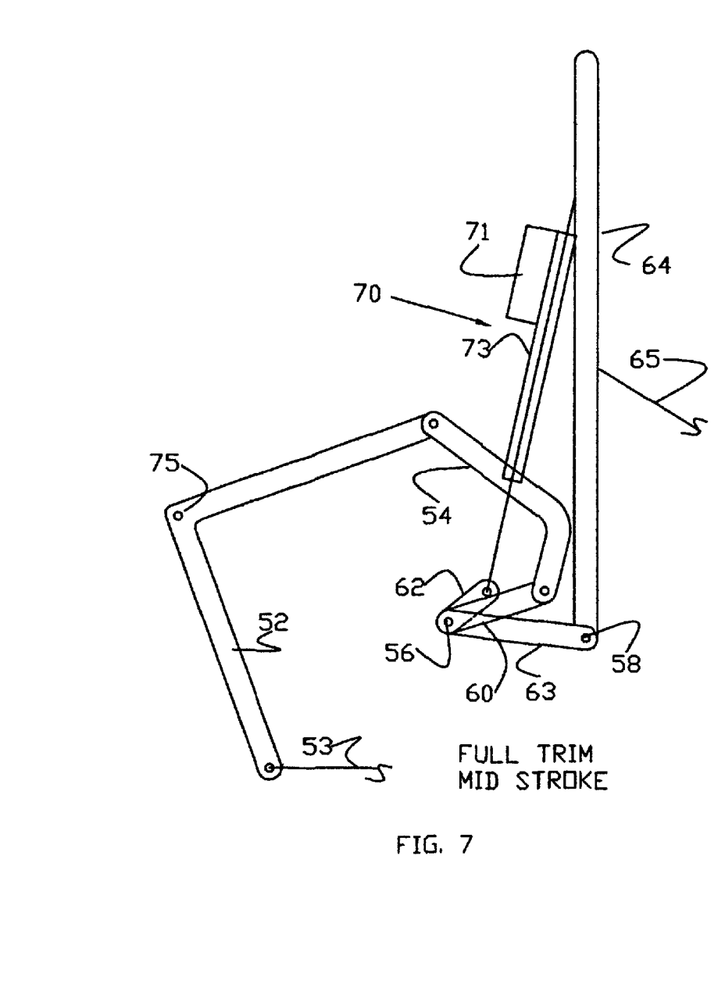
FIG. 7 is a schematic side view of the control system with the extensible link retracted and the control stick in mid-stroke. Aileron bell-cranks have been removed for clarity.
Figure 8:
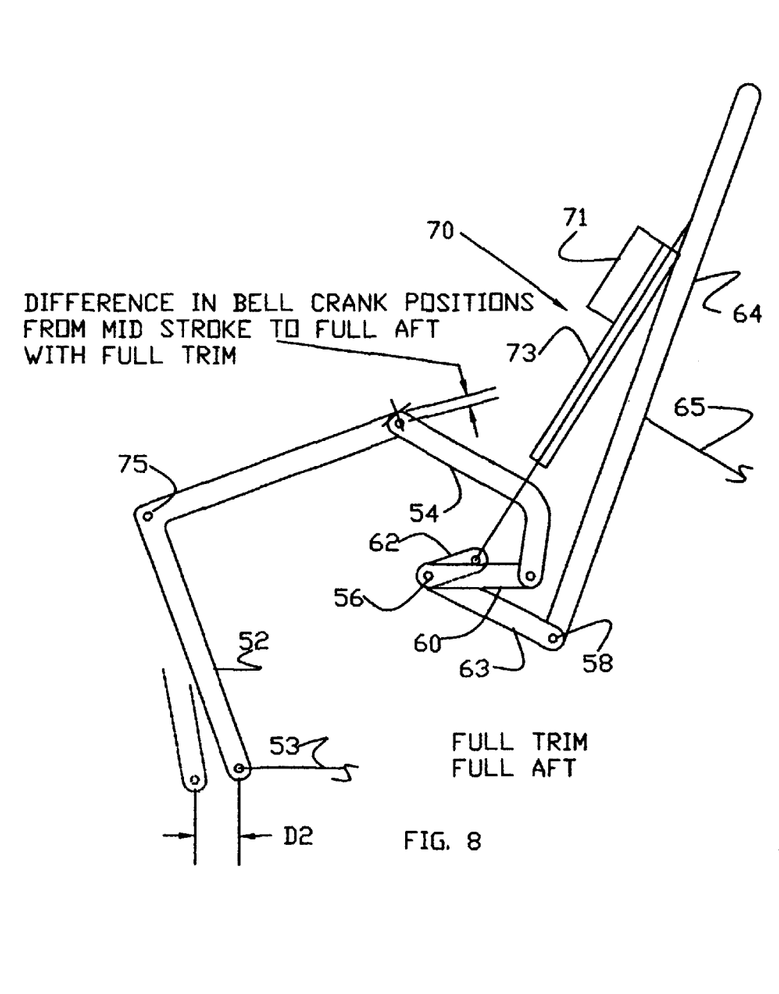
FIG. 8 is a schematic side view of the control system with the extensible link retracted and the control stick full aft stroke. Aileron bell-cranks have been removed for clarity.
Figure 9:
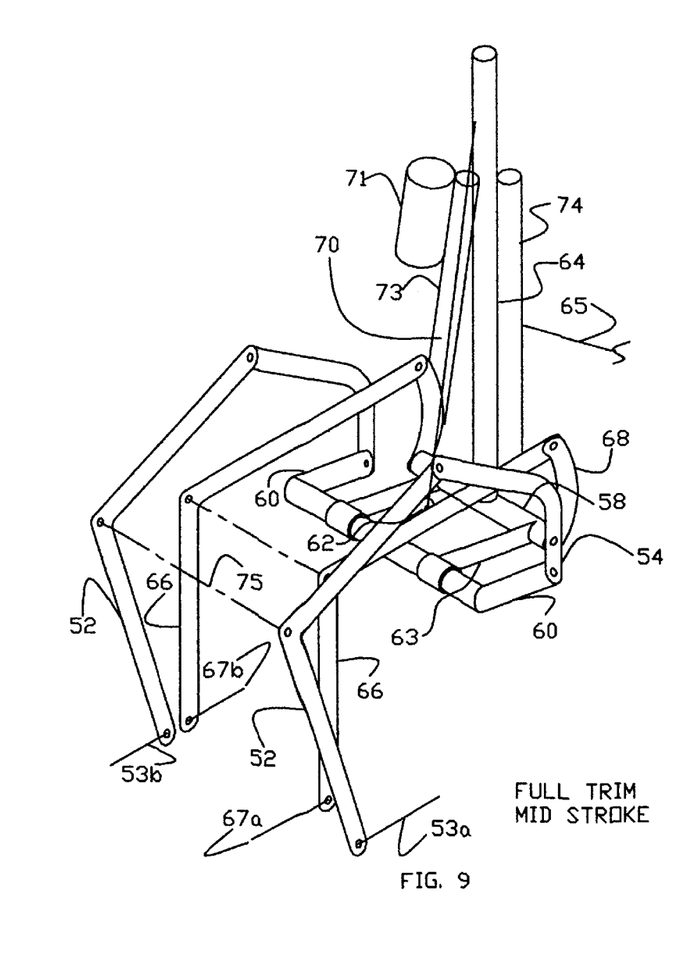
FIG. 9 is an enlarged perspective view of the control system shown in FIG. 2, with the extensible link retracted and the control stick mid-stroke.
Figure 10:
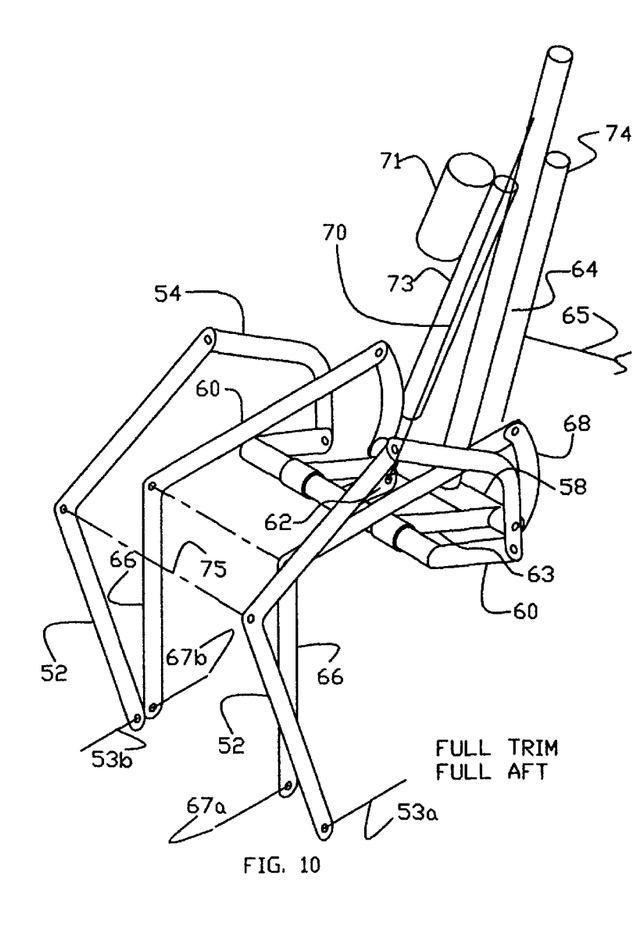
FIG. 10 is an enlarged perspective view of the control system shown in FIG. 2, with the extensible link retracted and the control stick full aft stroke.

Referring now to FIG. 7 and FIG. 8, the pilot has actuated motor 71 to retract the length of extensible link 70. This rotates center leg 62 counterclockwise or upward about the axis of ratio bar 56. Outward legs 60 also rotate with ratio bar 56. This causes rotation of rotor bell-cranks 52 about pivot axis 75. Outward legs 60 move from the near neutral position counter clockwise about 90°. In this full trim position, pulling control stick 64 aft the full distance from mid-stroke causes only a slight aft movement D2 of cables 53, much smaller than the distance D1 in FIG. 6. This occurs because when retracting extensible link 70, the radius R1 (FIGS. 5 and 6) between the fixed pivot point at control bar 58 and the junctions 76 between legs 60 and intermediate links 54 change to the much smaller R2 (FIGS. 6 and 7). When pulling back control stick 64 at radius R1 (FIGS. 7 and 6), junction 76 rotates about control bar 58 and moves a considerable circumferential distance because of the large radius R1. When pulling back control bar 58 while at radius R2 (FIGS. 7 and 8), the circumferential distance moved by junction 76 is much smaller because of the smaller radius R2. The radii R1 remain fixed during movement of control stick 64 and change only when extensible length 70 changes in length. When junction 76 moves only a small circumferential distance, as in FIGS. 7 and 8, bell crank 75 will pivot only a small amount compared to the amount of pivotal movement in FIGS. 5 and 6. Also, while the extensible link 70 is fully retracted or trimmed as shown in FIGS. 7 and 8, junction 76 is approximately on a line extending between control bar 58 and the junction of bell crank arms 52, 54. While extended in the no trim position of FIGS. 5 and 6,junction 76 is offset from the line extending between control bar 58 and the junction of bell crank arms 52, 54.

Retracting extensible link 70 thus desensitizes the effect of fore and aft movement of control stick 64 on the tilt of the spindle of rotor spindle 26 during high speed flight. Further, the amount of rotor 28 tilt to horizontal stabilizer 48 tilt is less when extensible link 70 is retracted. Rotor spindle 26 is tilted more rearward in FIG. 7 when control stick 64 is mid-stroke than in FIG. 5 when control stick 64 is in mid-stroke. This allows the rotor angle relative to the airstream to stay relatively constant as horizontal stabilizer 48 is moved, and pitches the aircraft over to reduce the angle of attack on the wings 18, 20. Also, as explained above, when extensible link 70 is retracted, it takes a larger movement of control stick 64 to tilt rotor 28 fore/aft a given amount than when extensible link 70 is extended. However, because horizontal stabilizer 48 is directly linked to control stick 64 rather than through ratio bar 56, it moves at the same ratio regardless of the extension or retraction of extensible link 70. The tilting of ailerons 22, 24 is also not affected by the extension or retraction of extensible link 70, as they tilt only during side to side tilting movement of control stick 64, not during fore and aft movement. Lateral movement of spindle 26 is also not affected by extensible link 70, rather spindle 26 tilts the same amount relative to the movement of control stick 64 regardless of the setting of extensible link 70. Other mechanisms other than a telescoping member such as extensible link 70 can also work for the same purpose to change the position of control point 76.

The entire control system 50 is mounted to tilt side to side about a pivot axis 72, as shown in FIG. 2. As control stick 64 is moved toward the right, left side rotor bell-crank 52 and aileron bell-crank 66 are moved upward, pushing left side cables 53a, 67a, while right side rotor bell-crank 52 and aileron bell-crank 66 are moved downward, pulling right side cables 53b, 67b. This causes rotor 28 to pitch right relative to aircraft 10 and right aileron 24 to tilt upward while left aileron 22 tilts downward. Moving control stick 64 toward the left causes rotor 28 to pitch left and left aileron 22 to tilt upward while right aileron 24 tilts downward. The position of extensible link 70 does not affect the lateral movement of spindle 26 nor the tilting of ailerons 22, 24.

A pair of force trim adjusters 74 are mounted rearward of control stick 64 and can be adjusted to set the control stick 64 force. For jump take-off, aircraft 10 is positioned to tilt slightly forward. Rotor 28 is at a right angle to the aircraft 10, yet tilting slightly forward relative to the ground, and spun to a predetermined speed with the collective rotor pitch set at zero (zero lift). Extensible link 70 is in the extended position while rotor 28 is being powered. Aircraft 10 is still on the ground and no tail rotor is required to counteract the torque going to rotor 28. When rotor 28 is up to speed and the pilot is ready for take off, the engine (not shown) is disengaged from rotor 28, and the pilot increases the collective rotor pitch. The combination of high rotor rpm and blade weight stores enough inertia energy to lift aircraft 10 a safe height above the ground.

Thrust from propeller 38 rapidly accelerates aircraft 10, causing wings 18,20 to develop lift. At the same time, rotor 28 decelerates because it is no longer being driven by the engine. The slowing of rotational speed of rotor 28 causes it to lose lift, but this is compensated for by the increase in lift occurring from wings 18, 20 due to forward acceleration from propeller 38. The lift from rotor 38 will increase as the forward speed increases for a given rotor rpm. Therefore as the forward speed increases, the rotor rpm must decrease in order to keep the rotor lift constant. The rpm must be further reduced as the wings 18, 20 produces more lift to keep the total lift constant.

During slow speed flight, aircraft 10 relies on rotor 28 for a large portion of the required lift; however rotor 28 is not powered. During forward flight at slow speed, rotor 28 must be tilted rearward relative to the airflow so that some of the air due to forward speed of the aircraft flows upward through blades 30,32 and drives rotor 28. Lift is maintained by controlling collective pitch and rotor 28 tilt relative to the airflow. The pilot can increase the airflow upward through blades 30,32, thus increasing rotor 28 speed, by moving control stick 64 rearward. This tilts rotor 28 rearward and the rearward edge of horizontal stabilizer 48 upward, thus tilting the entire aircraft 10 upward and allowing more air to flow upward through rotor 28. The pilot can reduce the airflow upward through blades 30, 32, and thus decrease rotor 28 speed, by moving control stick 64 forward and reducing the upward tilt of aircraft 10 and the rearward tilt of rotor 28. At slower speeds, the pilot can thus achieve desired lift by movement of control stick 64 forward and rearward to change rotor 28 tilt and also by changing the collective pitch of rotor 28.

Aircraft 10 climbs and dives by tilting horizontal stabilizer 48 up and down while proportionately tilting rotor 28 rearward and forward. Also, by increasing the collective pitch, the aircraft will climb up until a point where increasing the collective pitch more reduces the lift to drag ratio of rotor 28. . Moving control stick 64 forward tilts rotor 28 forward and horizontal stabilizer 48 downward, thus forcing aircraft 10 to tilt downward. This causes aircraft 10 to dive. At slower speeds, decreasing collective pitch will also cause to aircraft to dive because rotor 28 provides less lift at lower collective pitch.

Aircraft 10 can be made to yaw by rudders 44, 46. To change the aircraft direction, ailerons 22,24 move in opposite directions to roll the aircraft slightly and rotor 28 tilts until the desired bank is achieved. As control stick 64 is moved right, right aileron 24 tilts upward and left aileron 22 tilts downward causing aircraft 10 to bank right. The same procedure turns aircraft 10 left.

Rotor 28 begins to unload as the speed of aircraft 10 increases. When aircraft 10 reaches a speed in which wings 18, 20 can produce enough lift, preferably around 150 m.p.h, rotor 28 can be essentially unloaded. This is handled by two trim changes. The pilot reduces collective pitch to a small plus or minus angle or zero. By doing this, the angle of each rotor blade 30, 32 relative to the plane of rotation is reduced to zero or near zero. As the speed increases, the pilot pushes control stick 64 forward to keep the aircraft from climbing. Due to tilting rotor 28 forward, the rotor rotational speed slows down. To keep the rotational speed of rotor 28 from dropping too low, the pilot retracts extensible link 70 by pushing a button on control stick 64. The initial trim is set so this additional trimming occurs at around 125 m.p.h. This causes rotor 28 to tilt back slightly so that more air flows through rotor 28, thereby increasing the rotational speed of rotor 28. If the rotational speed increases too much, the pilot extends extensible link 70 to tilt rotor 28 forward and reduce the incoming airflow to just enough to keep rotor 28 rotating at a given low speed, approximately 100 r.p.m when the forward speed is great enough for the wings to carry most of the lift. The tilt of rotor 28 is then modulated with extensible link 70 in small movements to maintain the low rate of rotation while wing 18, 20 provides the required lift.

The pilot reduces the angle of rotor 28 relative to the airflow to slow its rotational speed, because a lower rotational speed during high speed flight reduces the forward drag on aircraft 10. Tis occurs because the tip velocities on the advancing blade of rotor 28 are the sum of the forward speed of the aircraft plus the rotational speed. At a high forward speed, the tip velocities will approach the speed of sound. Large frictional losses occur when blade tip velocities reach the speed of sound.

At high forward speeds, it is desirable to reduce the response sensitivity of rotor 28 tilt to control stick 64 inputs, thus preventing possible pilot induced oscillations. Further, because rotor 28 is not used for lift at high speeds, the relative angle between the tilt of rotor 28 and position of horizontal stabilizer 48 can be reduced. Both actions are accomplished by retracting extensible link 70. As discussed above, retracting extensible link 70 reduces the ratio of control stick 64 movement to rotor 28 tilt without affecting the ratio of control stick 64 movement to horizontal stabilizer 48 tilt or rotor 28 side to side tilt and aileron 22, 24 tilt. It also reduces the angle of rotor 28 relative to horizontal stabilizer 48. This lowers the rotational speed of rotor 28 to minimize the drag on rotor 28.

The invention has significant advantages. The adjusting member allows the sensitivity of the control stick to be adjusted. This is particularly an advantage because at high forward speeds, control stick should be desensitized from that required at low speeds and take off sequences. The adjusting mechanism does not affect other movements of the control stick, such as right and left tilting and movement of the horizontal stabilizer. Rotating the trailing edge of the horizontal stabilizer downward with forward movement of the control stick causes the aircraft to pitch over, further decreasing the lift of the rotor and decreasing the angle of attack on the wing as needed to provide the desired total lift.

While the invention has been shown in only one of its forms, it should be apparent to those skilled in the art that it is not so limited but it is susceptible to various changes without departing from the scope of invention.

What is claimed is:

1. In a rotor aircraft having a fuselage and a rotor mounted on a rotor head for tilting in fore and aft directions, an improved control system for controlling tilt of the rotor, an improved control system, comprising:

a control stick mounted to the fuselage for fore and aft movement;

a linkage assembly connected to the control stick and to the rotor head for tilting the rotor head in fore and aft directions in response to movement of the control stick;

an adjusting member mounted between the control stick and the linkage assembly, the adjusting member being movable between first and second positions while keeping the control stick stationary to reposition at least portions of the linkage assembly relative to the control stick into gross and fine positions, the fine position of the linkage assembly desensitizing the control stick so that a selected fore and aft movement of the control stick causes less tilting movement of the rotor head than while in the gross position; wherein the control stick is pivotally mounted to the fuselage about a control stick pivot point, and the linkage assembly has a control point that rotates about the control stick pivot point while the control stick pivots between fore and aft positions; and wherein the adjusting member varies a radius between the control point and the control stick pivot point as the adjusting member moves between the first and second positions.

2. In a rotor aircraft having a fuselage and a rotor mounted on a rotor head for tilting in fore and aft directions, an improved control system for controlling tilt of the rotor, an improved control system, comprising:

a control stick mounted to the fuselage for fore and aft movement;

a linkage assembly connected to the control stick and to the rotor head for tilting the rotor head in fore and aft directions in response to movement of the control stick;

an adjusting member mounted between the control stick and the linkage assembly, the adjusting member being movable between first and second positions while keeping the control stick stationary to reposition at least portions of the linkage assembly relative to the control stick into gross and fine positions, the fine position of the linkage assembly desensitizing the control stick so that a selected fore and aft movement of the control stick causes less tilting movement of the rotor head than while in the gross position; wherein the control stick is pivotally mounted to the fuselage about a control stick pivot point and the linkage assembly comprises:

a bell crank assembly pivotally mounted to the fuselage about a bell crank pivot point;

an leg secured to the bell crank assembly at a control pivot point that is spaced from the control stick pivot point by a radius, the leg being connected with the control stick so that fore and aft movement of the control stick causes the control point to move a circumferential distance relative to the control stick pivot point at the same radius, thereby pivoting the bell crank assembly about the bell crank pivot point an amount proportional to the circumferential distance; and moving the adjusting member from the first to the second positions reduces the radius and thus the circumferential distance that the control point travels, causing the bell crank assembly to move less about the pivot point and thus tilt the rotor head less for a given movement of the control stick, a control point that rotates about the control stick pivot point while the control stick pivots between fore and aft positions; and wherein the adjusting member varies a radius between the control point and the control stick pivot point as the adjusting member moves between the first and second positions.

3. In a rotor aircraft having a fuselage and a rotor mounted on a rotor head for tilting in fore and aft directions, an improved control system for controlling tilt of the rotor, an improved control system, comprising:

a control stick mounted to the fuselage for fore and aft movement;

a linkage assembly connected to the control stick and to the rotor head for tilting the rotor head in fore and aft directions in response to movement of the control stick; and an adjusting member mounted between the control stick and the linkage assembly, the adjusting member being movable between first and second positions while keeping the control stick stationary to reposition at least portions of the linkage assembly relative to the control stick into gross and fine positions, the fine position of the linkage assembly desensitizing the control stick so that a selected fore and aft movement of the control stick causes less tilting movement of the rotor head than while in the gross position.

4. The aircraft according to claim 3, wherein the adjusting member is variable in length between the first and second positions.

5. The aircraft according to claim 3, wherein the adjusting member is variable in length between the first and second positions, and wherein the aircraft further comprises:

a motor mounted to the adjusting member for varying the length of the adjusting member between the first and second positions.

6. The aircraft according to claim 3, wherein the rotor is also tiltable in lateral directions in response to lateral movement of the control stick; and wherein movement of the adjusting member between the first and second positions has no effect on a ratio of an amount of lateral tilting movement of the rotor bead in response to lateral movement of the control stick.

7. In a rotor aircraft having a fuselage and a rotor mounted on a rotor head for tilting in fore and aft directions, an improved control system for controlling tilt of the rotor, an improved control system, comprising:

a control stick mounted to the fuselage for fore and aft movement;

a linkage assembly connected to the control stick and to the rotor head for tilting the rotor head in fore and aft directions in response to movement of the control stick;

an adjusting member mounted between the control stick and the linkage assembly, the adjusting member being movable between first and second positions while keeping the control stick stationary to reposition at least portions of the linkage assembly relative to the control stick into gross and fine positions, the fine position of the linkage assembly desensitizing the control stick so that a selected fore and aft movement of the control stick causes less tilting movement of the rotor head than while in the gross position; wherein the aircraft further comprises:

a horizontal stabilizer mounted to an aft section of the fuselage, the horizontal stabilizer being tiltable in upward and downward positions;

a horizontal stabilizer linkage connected between the horizontal stabilizer and the control stick so that fore and aft movement of the control stick tilts the horizontal stabilizer up and down; and wherein         the horizontal stabilizer linkage is isolated from the adjusting member so that movement of the adjusting member between the first and second positions has no effect on an amount of tilt of the horizontal stabilizer relative to an amount of fore and aft movement of the control the control stick.

8. In a rotor aircraft having a fuselage and a rotor mounted on a rotor head for tilting in fore and aft directions, an improved control system for controlling tilt of the rotor, an improved control system, comprising:

a control stick mounted to the fuselage for fore and aft movement;

a linkage assembly connected to the control stick and to the rotor head for tilting the rotor head in fore and aft directions in response to movement of the control stick;

an adjusting member mounted between the control stick and the linkage assembly, the adjusting member being movable between first and second positions while keeping the control stick stationary to reposition at least portions of the linkage assembly relative to the control stick into gross and fine positions, the fine position of the linkage assembly desensitizing the control stick so that a selected fore and aft movement of the control stick causes less tilting movement of the rotor head than while in the gross position; wherein the aircraft further comprises:

a wing extending from opposite sides of the fuselage;

an aileron pivotally mounted to each wing for up and down tilting movement;

an aileron linkage connected between the control stick and each of the ailerons for causing tilting movement of the ailerons in response to lateral movement of the control stick relative to the fuselage; and wherein         the aileron linkages are isolated from the adjusting member so that movement of the adjusting member between the first and second positions has no effect on an amount of tilt of the ailerons relative to an amount of lateral movement of the control stick.

9. An aircraft, comprising:

fuselage;

a horizontal stabilizer pivotally mounted to an aft section of the fuselage for upward and downward tilting movement;

a rotor head extending upward from the fuselage, the rotor heads being tiltable in fore and aft directions relative to the fuselage;

a rotor mounted to the rotor head for rotation relative to the fuselage;

a control stick pivotally mounted in a cockpit of the aircraft for fore and aft and side to side movement;

a rotor linkage assembly connected between the control stick and the rotor head for tilting the rotor head fore and aft in response to the fore and aft movement of the control stick and tilting the rotor head laterally in response to lateral movement of the control stick; and a horizontal stabilizer linkage assembly pivotally connected between the control stick and the rotor head, the rotor linkage assembly and the horizontal stabilizer linkage assembly being connected with the control stick such that forward movement of the control stick from an aft position causes forward tilting of the rotor head and downward tilting of a trailing edge of the horizontal stabilizer.

10. The aircraft according to claim 9, wherein the aircraft further comprises:

a wing extending from opposite sides of the fuselage;

an aileron pivotally mounted to each wing for up and down tilting movement;

an aileron linkage connected between the control stick and each of the ailerons for causing tilting movement of the ailerons in response to lateral movement of the control stick relative to the fuselage.

11. An aircraft, comprising:

a fuselage;

a horizontal stabilizer pivotally mounted to an aft section of the fuselage for upward and downward tilting movement; rotor head extending upward from the fuselage, the rotor heads being tiltable in fore and aft directions relative to the fuselage;

a rotor mounted to the rotor head for rotation relative to the fuselage;

a control stick pivotally mounted in a cockpit of the aircraft for fore and aft and side to side movement;

a rotor linkage assembly connected between the control stick and the rotor head for tilting the rotor head fore and aft in response to the fore and aft movement of the control stick and tilting the rotor head laterally in response to lateral movement of the control stick;

a horizontal stabilizer linkage pivotally connected between the control stick and the rotor head, the rotor linkage assembly and the horizontal stabilizer linkage assembly being connected with the control stick such that forward movement of the control stick causes forward tilting of the rotor head and downward tilting of a trailing edge of the horizontal stabilizer;

an adjusting member between the rotor linkage assembly and the control stick that moves the rotor linkage assembly between gross and fine positions relative to the control, such that movement of the rotor linkage to the fine position causes less fore and aft tilt of the rotor head when the control stick moves between full fore and aft positions than while in the gross position; and wherein     the horizontal stabilizer linkage is isolated from movement of the rotor linkage assembly between the fine and gross positions, providing the same amount of horizontal stabilizer tilt for a given fore and aft movement of the control stick regardless of the fine and gross positions.

12. A rotor aircraft, comprising:

a fuselage;

a rotor mounted on a rotor head for tilting in fore and aft and lateral directions, a control stick mounted to the fuselage about a control stick pivot point for fore and aft and laterally movement;

a rotor linkage assembly connected to the control stick and to the rotor head for tilting the rotor head in response to tilting movement of the control stick, the linkage assembly having a control point that rotates at a radius about the control stick pivot point; and an adjusting member mounted between the control stick and the linkage assembly, the adjusting member being movable to change the radius from the control point to the control stick pivot point, wherein the radius corresponds to the amount of tilt that the rotor head makes while moving between full aft and full forward positions with the control stick.

13. The aircraft according to claim 12, wherein the adjusting member is linearly extensible.

14. The aircraft according to claim 12, wherein a greater radius causes more fore and aft tilt of the rotor head in response to full fore and aft movement of the control stick than a lesser radius.

15. The aircraft according to claim 12, wherein movement of the adjusting member to change the radius has no effect on a ratio of an amount of lateral tilting movement of the rotor head in response to lateral movement of the control stick.

16. A method for controlling forward and rearward tilt of a rotor head that supports a rotor that rotates relative to a fuselage, comprising:

(a) pivotally mounting a control stick in the fuselage for fore and aft movement;

(b) connecting a rotor linkage between the control stick and the rotor head, the rotor linkage having a fine position and a gross position;

(c) placing the rotor linkage in the gross position and moving the control stick from a full aft to a full forward position, thereby tilting the rotor head a gross amount in fore and aft directions; and (d) placing the rotor linkage in the fine position and moving the control stick from the full aft to the full forward position, thereby tilting the rotor head a fine amount that is much less than the gross amount.

17. A method for controlling forward and rearward tilt of a rotor head that supports a rotor that rotates relative to a fuselage, comprising:

(a) pivotally mounting a control stick in the fuselage for fore and aft movement;

(b) connecting a rotor linkage between the control stick and the rotor head, the rotor linkage having a fine position and a gross position;

(c) placing the rotor linkage in the gross position and moving the control stick from a full aft to a full forward position, thereby tilting the rotor head a gross amount in fore and aft directions;

(d) placing the rotor linkage in the fine position and moving the control stick from the full aft to the full forward position, thereby tilting the rotor head a fine amount that is much less than the gross amount; wherein:

step (a) comprises mounting the control stick about a control stick pivot point; and step (b) comprises providing the rotor linkage with a control point that rotates about the pivot point at a first radius while in the gross position and at a second and smaller radius while in the fine position.

18. A method for controlling forward and rearward tilt of a rotor head that supports a rotor that rotates relative to a fuselage, comprising:

(a) pivotally mounting a control stick in the fuselage for fore and aft movement;

(b) connecting a rotor linkage between the control stick and the rotor head, the rotor linkage having a fine position and a gross position;

(c) placing the rotor linkage in the gross position and moving the control stick from a full aft to a full forward position, thereby tilting the rotor head a gross amount in fore and aft directions;

placing the rotor linkage in the fine position and moving the control stick from the full aft to the full forward position, thereby tilting the rotor head a fine amount that is much less than the gross amount; wherein the aircraft has a horizontal stabilizer located at an aft end of the fuselage, and wherein the method further comprises:

connecting a horizontal stabilizer linkage between the control stick and the horizontal stabilizer step (c) comprises tilting a trailing edge of the horizontal stabilizer fully downward in response to the full forward movement of the control stick and fully upward in response to the full aft movement of the control stick; and step (d) comprises tilting the trailing edge of the horizontal stabilizer fully downward and fully upward the same amount as in step (c).

19. A method for controlling forward and rearward tilt of a rotor head that supports a rotor that rotates relative to a fuselage, comprising:

(a) pivotally mounting a control stick in the fuselage for fore and aft movement;

(b) connecting a rotor linkage between the control stick and the rotor head, the rotor linkage having a fine position and a gross position;

(c) placing the rotor linkage in the gross position and moving the control stick from a full aft to a full forward position, thereby tilting the rotor head a gross amount in fore and aft directions;

(d) placing the rotor linkage in the fine position and moving the control stick from the full aft to the full forward position, thereby tilting the rotor head a fine amount that is much less than the gross amount;

while the rotor linkage is in the gross position, moving the control stick from a full starboard position to a full port position, and thereby causing tilting of the rotor head from a full starboard position to a full port position; and while the rotor linkage is in the fine position, moving the control stick from the full starboard position to the full port position, and thereby causing tilting of the rotor head from the full starboard position to the full port position.

* * * * *